(12) United States Patent
Kim

(10) Patent No.: US 8,601,571 B2
(45) Date of Patent: Dec. 3, 2013

(54) MULTI-USER COMPUTER SYSTEM AND REMOTE CONTROL METHOD THEREOF

(75) Inventor: Chan-woo Kim, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1605 days.

(21) Appl. No.: 11/497,333

(22) Filed: Aug. 2, 2006

(65) Prior Publication Data

US 2007/0061587 A1 Mar. 15, 2007

(30) Foreign Application Priority Data

Aug. 18, 2005 (KR) ........................ 10-2005-0075684

(51) Int. Cl.
*G06F 7/04* (2006.01)
(52) U.S. Cl.
USPC ...... 726/20; 726/1; 726/2; 380/247; 380/248; 380/249; 380/250; 705/18; 710/107; 711/147; 711/148; 711/149; 711/150; 711/151; 711/152; 711/153

(58) Field of Classification Search
USPC .................. 726/1–21; 380/247–250; 705/18; 710/107; 711/147–153
See application file for complete search history.

(56) References Cited

U.S. PATENT DOCUMENTS

| | | | |
|---|---|---|---|
| 6,675,300 B1 | 1/2004 | Jung et al. | |
| 2002/0138422 A1* | 9/2002 | Natsuno | 705/39 |
| 2003/0048174 A1* | 3/2003 | Stevens et al. | 340/5.64 |
| 2003/0048789 A1 | 3/2003 | Kim | |
| 2005/0044348 A1* | 2/2005 | O'Connell | 713/1 |
| 2005/0071665 A1* | 3/2005 | Zimmer et al. | 713/200 |
| 2005/0221800 A1* | 10/2005 | Jackson et al. | 455/411 |
| 2005/0257050 A1* | 11/2005 | Gierens et al. | 713/165 |
| 2006/0020980 A1* | 1/2006 | Peng | 725/81 |
| 2006/0036952 A1* | 2/2006 | Yang | 715/741 |
| 2006/0101290 A1* | 5/2006 | Ma | 713/300 |
| 2006/0294364 A1* | 12/2006 | Sasabe | 713/155 |

FOREIGN PATENT DOCUMENTS

| | | |
|---|---|---|
| JP | 2001-296936 | 10/2001 |
| KR | 1998-78746 | 11/1998 |
| KR | 2000-60253 | 10/2000 |
| KR | 2000-60254 | 10/2000 |
| KR | 2000-60992 | 10/2000 |
| KR | 2000-61509 | 10/2000 |
| KR | 2003-13710 | 2/2003 |
| KR | 2003-22467 | 3/2003 |

OTHER PUBLICATIONS

Notice of Allowance issued by Korean Intellectual Property Office in Korean Patent Application 2005-75684 on Sep. 17, 2007.
Office Action issued in Korean Patent Application No. 2005-75684 on Oct. 31, 2006.

* cited by examiner

*Primary Examiner* — Edan Orgad
*Assistant Examiner* — Roderick Tolentino
(74) *Attorney, Agent, or Firm* — Jefferson IP Law, LLP

(57) ABSTRACT

A multi-user computer system and a remote control method for the multi-user computer system includes a remote controller, with an input unit that receives a remote-control password to remotely operate the computer, information on an OS booted when the remote-control password is input, a key input setting the computer in a mode wherein the remote-control password and the OS information are set, and a key input operating the computer, a microprocessor, a wireless transmitter, and a computer, with a wireless receiver, a microprocessor, and a BIOS that automatically loads an OS corresponding to the remote-control password stored in the memory when the received remote-control password stored in the wireless receiver and the remote-control password in the memory are the same.

14 Claims, 6 Drawing Sheets

MULTI-USER COMPUTER SYSTEM AND REMOTE CONTROL METHOD THEREOF

CROSS-REFERENCE TO RELATED APPLICATION

This application claims the benefit of Korean Application No. 2005-75684, filed Aug. 18, 2005 in the Korean Intellectual Property Office, the disclosure of which is incorporated herein by reference.

BACKGROUND OF THE INVENTION

1. Field of the Invention

The present invention relates to a multi-user computer system and a remote control method thereof, and more particularly, to a multi-user computer system and a remote control method thereof that maintains security by setting a password and information on an operating system (OS) of a user so that when a computer is switched on by a remote controller, the operating system corresponding to the user is automatically booted according to the input password.

2. Description of the Related Art

Keyboards and mice are user interfaces that are used to switch on a computer or input commands to the computer. Computers having several functions controlled by a remote controller are now available. Accordingly, a user may remotely control a computer system using a remote controller. Further, computer systems are being developed with more convenient user interfaces.

Generally, a user uses a power button or a remote controller provided for multimedia functions to turn on system power to a device, such as a computer. If a computer, a post-process is initiated by a BIOS when the power is switched on. A window then pops up asking for a password. The user types in the password using a keyboard. Once the password has been verified, the computer starts up. In multi-booting cases for multiple users, a screen appears so that the user can select an OS to boot using an input device, and then the OS is booted.

In line with a current trend in reinforcing multimedia functions, many computers now have a function that allows them to turn on system power using a remote controller. However, because remote controllers and computers manufactured by the same manufacturer transmit and receive the same recognition code, security problems may occur. For example, if someone has the same make computer and remote controller as another user, that person can turn on another user's computer and control several functions of the computer using the remote controller. As a result, security problems could occur.

In addition, in the case of a multi-user computer having multiple operational systems, a boot password may be the same regardless of the user. Therefore, once the boot password has been verified through a window where the user selects an OS to load, not only can one of the user boot his/her OS, but they can boot another user's OS, which is a security problem.

SUMMARY OF THE INVENTION

Additional aspects and/or advantages of the invention will be set forth in part in the description which follows and, in part, will be obvious from the description, or may be learned by practice of the invention.

Aspects of the present invention include a multi-user computer system and a remote control method thereof that allows a user to set his/her own password so that a computer is operated upon remote-controlled password verification.

Another aspect of the present invention include a user-friendly multi-user computer system and a remote control method thereof by incorporating information on an OS of a user into a password so that a computer is turned on, and the OS is booted by one simple operation of a remote controller.

Aspects of the present invention include a multi-user computer system including a remote controller including an input unit that receives a remote-control password to remotely operate the computer, information on an operating system (OS) to be booted when the remote-control password is input, a key input setting the computer in a mode in which the remote-control password and the OS information are set, and a key input operating the computer, a micro processor (Micom) that converts the remote-control password in the input unit, the OS information, the mode-setting key input, and the computer-operating key input into a control signal, and a wireless transmitter that transmits the control signal, and a computer including a wireless receiver that receives the control signal transmitted by the remote controller to remotely operate the computer, a computer Micom that extracts the remote-control password, the information on the OS, the input key to setting mode, and the input key to operate the computer, and controls the computer power, a memory that stores the remote-control password and the information on the OS, and a BIOS that automatically loads an OS corresponding to the remote-control password stored in the memory when the received remote-control password stored in the wireless receiver and the remote-control password in the memory match.

Aspects of the present invention include a remote control method for a multi-user computer system including switching to a remote-control password-setting mode, receiving, via a remote controller, the remote-control password and information on an operating system (OS) that will be booted by a computer when the remote-control password is input, storing the remote-control password and the information on the OS, and setting information indicating that the computer is to be operated by the remote controller.

Aspects of the present invention includes a remote control method of a multi-user computer system including receiving an operating signal to drive a computer via a remote controller, receiving a remote-control password via the remote controller, comparing the received remote-control password to one or more remote-control passwords stored in the computer, and automatically booting an OS registered with the received remote-control password when the received remote-control password matches with at least one of the remote-control passwords stored in the computer.

Aspects of the present invention includes remote controller usable with a multi-user computer system, including an input unit that receives a control information for turning on a computer and automatically boots an operating system (OS) corresponding to a user on the computer, a Micom that converts the control information into a control signal, and a wireless transmitter that transmits the control signal.

Aspects of the present invention includes a computer useable with a multi-user computer system, including a wireless receiver that receives a control signal transmitted by a remote controller to remotely operate the computer, a computer Micom that extracts a remote-control password, an information on an operating system (OS), an input key for the setting mode, and an input key to operate the computer, and controls the computer power, a memory that stores the remote-control password and the information on the OS, and a BIOS that automatically loads an OS corresponding to the remote-control password stored in the memory when the received remote-control password stored in the wireless receiver and the remote-control password in the memory are the same.

Aspects of the present invention includes a method of remotely operating a multi-user computer, including checking whether a power-on mode has been activated by a prior remote controller operation, receiving a remote-control password via a remote controller, booting an operating system registered to correspond with the remote-control password, and logging on automatically to the operating system.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
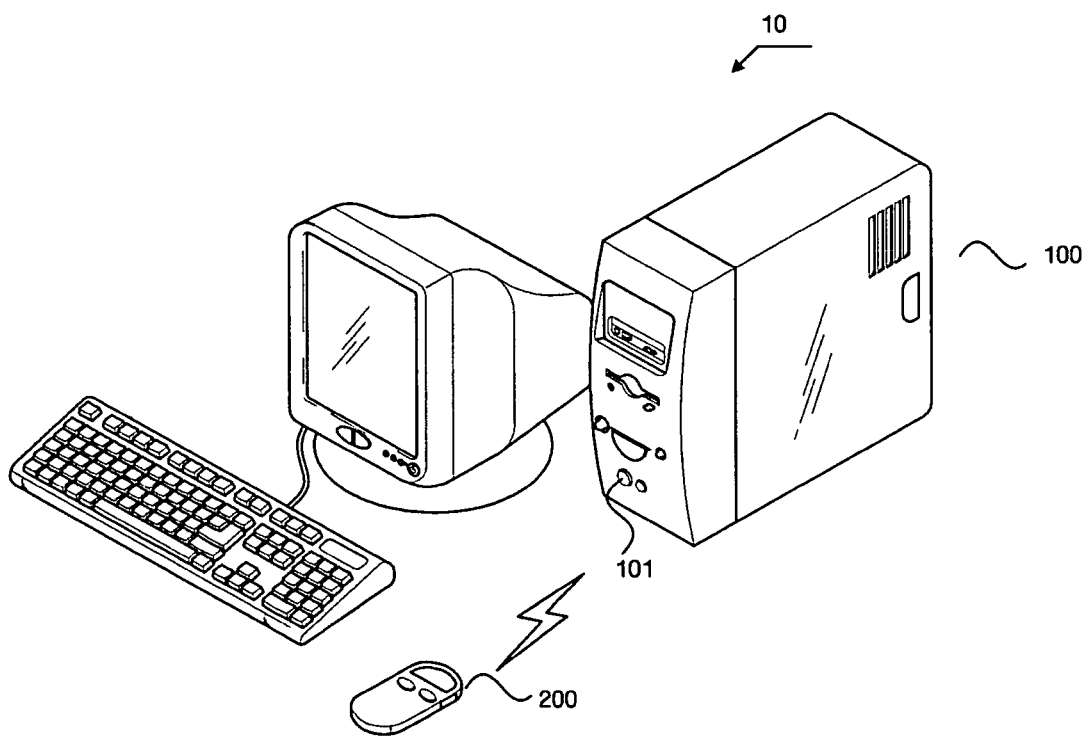
FIG. 1 is an external rendering of a multi-user computer system according to an aspect of the present invention.

Reference will now be made in detail to the various aspects of the present invention, examples of which are illustrated in the accompanying drawings, wherein like reference numerals refer to the like elements throughout. The aspects are described below in order to explain the present invention by referring to the figures.

The aspects of the present invention will be described hereinafter with reference to block diagrams or flowchart illustrations of a multi-user computer system and a remote control method thereof. It will be understood that each block of the flowchart, illustrations, and combinations of blocks in the flowchart illustrations can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded into a computer or other programmable data processing apparatus to cause a series of operational steps to be performed in the computer or other programmable apparatus to produce a computer implemented process such that the instructions that execute in the computer or other programmable apparatus provide steps for implementing the functions specified in the flowchart block or blocks.

Further, each block of the block diagrams may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

FIG. 1 is an external rendering of a multi-user computer system 10 according to an aspect of the present invention. The multi-user computer system 10 can be operated by a power switch 101 of a computer 100 and can be remotely operated by a remote controller 200. A user registers his/her remote-control password and a desired OS information in the computer 100 in order to operate the computer 100 using the remote controller 200. Once the remote-control password and the desired OS information have been registered in the computer 100, the computer 100 is able to activate a power-on mode bit using the remote controller 200, to receive a power on control signal. Once the computer 100 receives the power-on control signal and the remote-control password from the remote controller 200, the computer 100 checks if the transmitted remote-control password is identical to the registered remote-control password. If the transmitted password matches the registered password, the computer 100 automatically boots an operating system (OS) corresponding to the remote-control password to complete the operation of the computer 100. The system 10 can be the computer with external display as shown, and can also be a portable computer or a home entertainment system.

Figure 2:
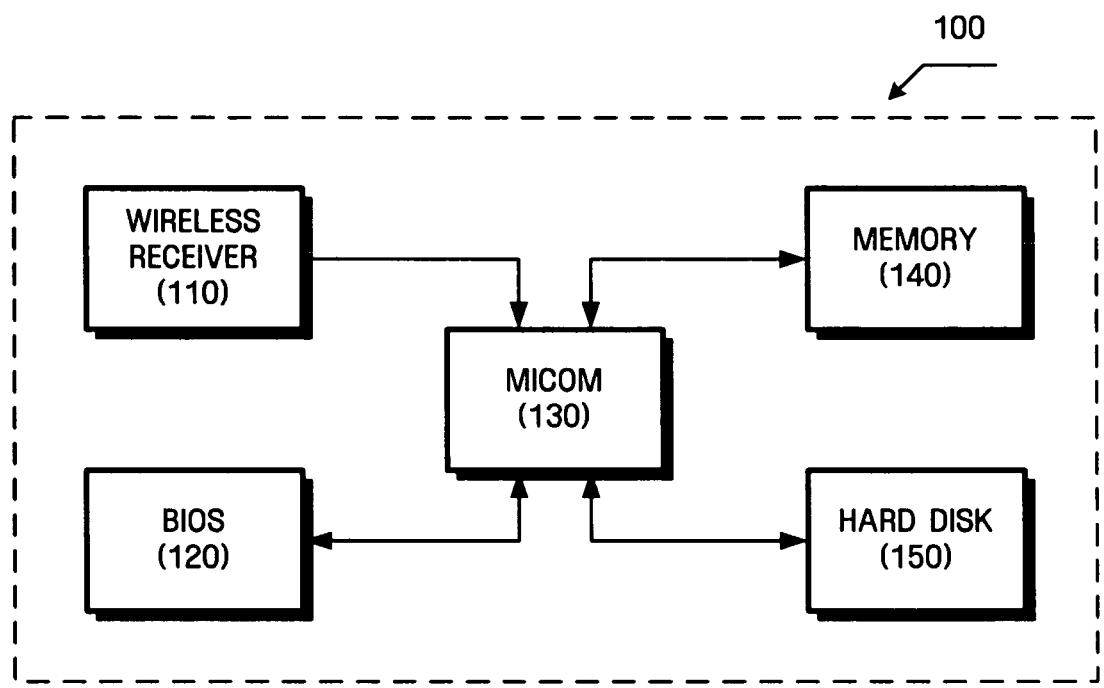
FIG. 2 is a block diagram illustrating the configuration of a multi-user computer system according to an aspect of the present invention.

The computer 100 operated by a remote control method according to an aspect of the present invention includes a wireless receiver 110, a BIOS 120, a micro processor (Micom) 130, memory 140, and a hard disk 150, as illustrated in FIG. 2. However, it is understood that the computer 100 can include other components, such as optical drivers, flash memories, and/or integrated displays in other aspects of the present invention.

The wireless receiver 110 receives a remote control signal from the remote controller 200, and transmits the received signal to the Micom 130. For example, in a remote-control password-setting mode, when the user presses an on button on the remote controller 200 and inputs the remote-control password, and when the remote-control password and a desired OS information to be registered are received, the wireless receiver 110 receives a remote control signal containing the power-on code information and the remote-control password. The wireless receiver 110 then transmits the remote-control password, the desired OS information, and a variety of remote control signals, to the Micom 130.

Once the Micom 130 receives the remote control signal corresponding to the remote-control password setting mode from the wireless receiver 110, the Micom 130 stores the received remote-control password and the desired OS information in the memory 140, and activates the power-on mode bit.

Upon subsequent receipt of the remote-control signal containing the power-on code to activate the power-on mode bit and the remote-control password, the Micom 130 checks the power-on mode has been activated by the remote controller 200. If the power-on mode has been activated, the Micom 130 confirms whether the remote-control password from the remote controller 200 matches at least one of the remote-control passwords stored in an electrically erasable programmable read-only memory (EEPROM) 140. If matching passwords exists, the Micom 130 transmits the desired OS information registered together with the remote-control password to the BIOS 120 to allow a boot process to initiate by loading the corresponding desired OS.

The memory 140 is a non-limiting example of a memory device capable of storing a large amount of information. The memory 140 stores the remote-control password and the desired OS information that will be booted by the remote-control password when the computer 100 is switched on. While not required in all aspects, information on the OS may be partition information stored on a hard disk location where the desired OS information is located, such as when different OS are stored in different partitions of the hard disk. Examples of the memory 140 may be an EEPROM, a complementary metal oxide semiconductor (CMOS), a FLASH memory, a hard disk, optical media, and/or magneto optical media, but are not limited thereto. Further, it is understood that the memory 140 can be external to the computer 140 so long as the memory 140 is accessible to the Micom 130 in other aspects of the present invention.

The role of the BIOS 120 is to check the computer's resources when the computer 100 is turned on, and to give notice to the OS of the resources. Especially, in the case of the computer 100 according to an aspect of the present invention, when the computer 100 is turned on by the remote controller 200, the BIOS 120 allows the Micom 130 to verify the remote-control password, and may allow the Micom 130 to skip an additional process of verifying a boot password. If the remote-control password is confirmed as valid, the BIOS 120 receives information of the desired OS to be booted from the Micom 130 and loads the desired OS. If needed, specific applications may be executed to automatically log onto the desired OS.

The hard disk 150 may store two or more OSs, and may be partitioned to store different OSs in each partition. However, this storage is not required in all aspects of the present invention. Further, while described in terms of different OS, the hard disk 150 may store as the OSs multiple user profiles running on a common operating system (OS) for different users with different passwords separate access.

Figure 3:
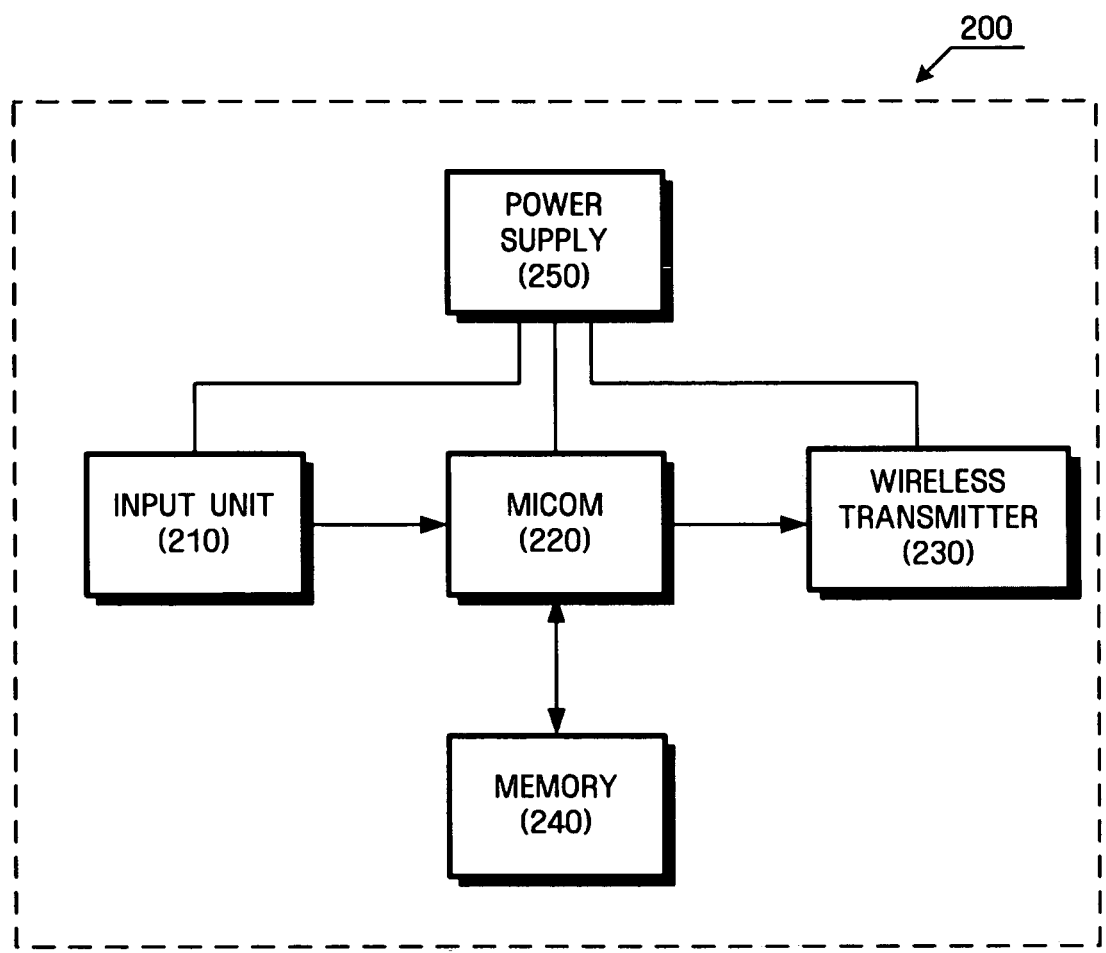
FIG. 3 is a block diagram illustrating the configuration of a remote controller according to an aspect of the present invention.

The remote controller 200 of the computer system 10 according to an aspect of the present invention is illustrated in FIG. 3. The remote controller 200 may comprise of an input unit 210, the Micom (or a processor) 220, a wireless transmitter unit 230, a memory 240, and a power supply 250. However, the controller 200 may have other components, such as those used in telephones, portable audio/video devices, PDAs, etc.

A user selects a remote-control password-setting mode via an input unit 210, and inputs a remote-control password and a desired OS information to be registered. In addition, the user may use the input unit 210 to switch on the power of the computer 100 and input the remote-control password.

Once the remote-control password-setting mode has been selected, the Micom 220 converts the mode selection into a remote control signal, notifies the computer 100 of the mode selection via the wireless transmitter 230, converts the received remote-control password and the desired OS information into another remote control signal, and transmits the another signal to the computer 100 via the wireless transmitter 230. The wireless transmitter 230 can be light based, such as using infrared signals, or using protocols such as Bluetooth and/or other networking protocols.

Additionally, once the on button of the computer 100 is selected, the Micom 220 receives the remote control signal that includes the power-on code and the remote-control password from the input unit 210, and transmits the signal to the wireless transmitter 230.

The memory 240 stores a code value corresponding to each button input of the remote controller 200. The power supply 250 supplies power to the input unit 210, the Micom 220, and the wireless transmitter 230.

In the aspects of the present invention illustrated in FIG. 2 to 3, each component may be implemented, but is not limited to, a software or hardware component, such as a field programmable gate array (FPGA) or an application specific integrated circuit (ASIC), which performs certain tasks. A module may advantageously be configured to reside on the addressable storage medium and to execute on one or more processors. The functionality provided for in the components and modules may be combined into fewer components and modules or further separated into additional components and modules.

Figure 4:
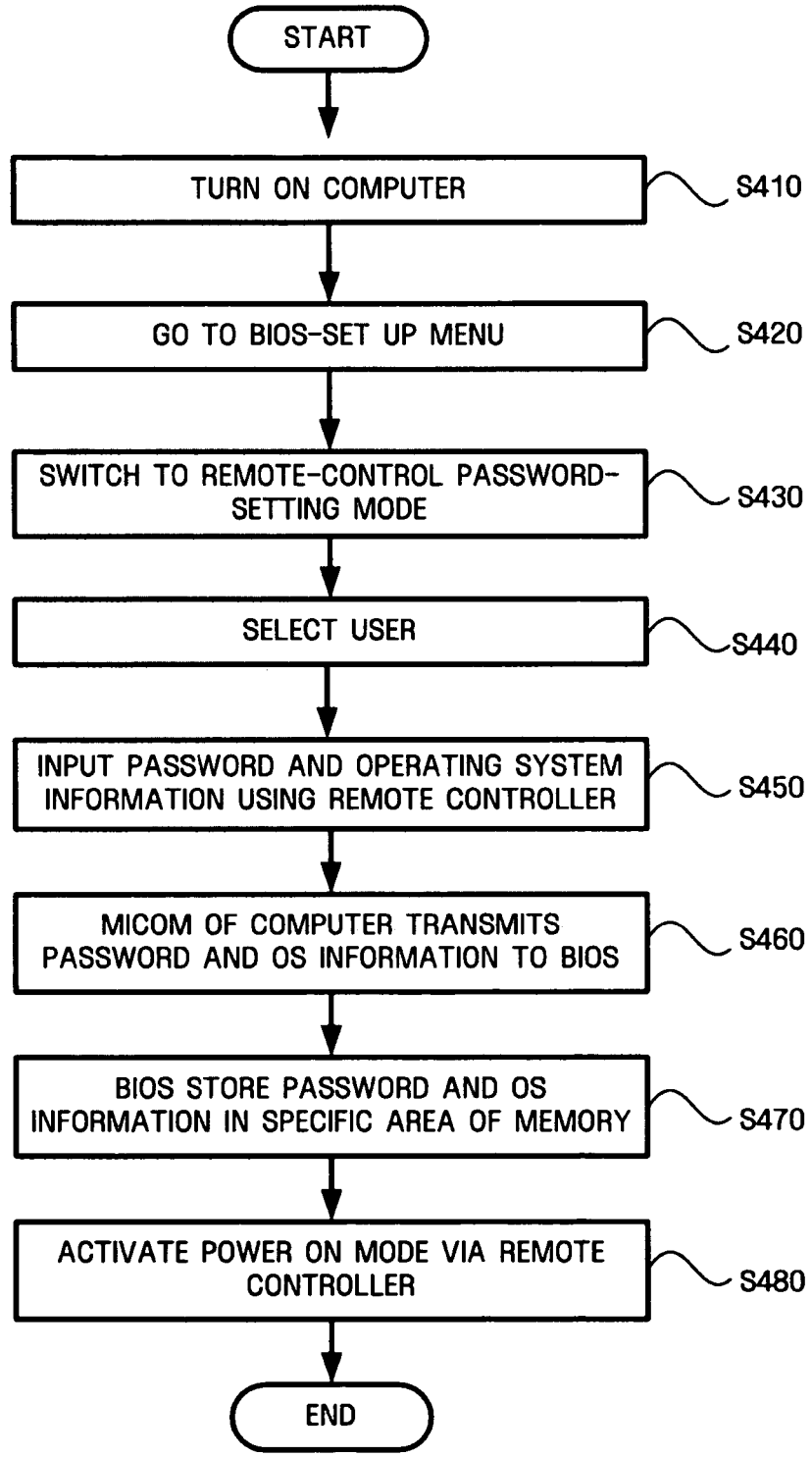
FIG. 4 is a flowchart illustrating a process of setting a remote-control password using a remote controller according to an aspect of the present invention.

Hereinafter, the apparatuses of FIGS. 2 and 3 may be used to implement the methods of FIGS. 4 through 6, but such use is not required. FIG. 4 is a flowchart illustrating a process of setting a remote-control password using a remote controller according to an aspect of the present invention. When power of a computer 100 is turned on in operation S410, a BIOS-setup menu is entered in operation S420. The remote-control password-setting mode is entered in operation S430. While not restricted thereto, the computer 100 may be turned on by either pressing a computer power switch 101, or pressing a power button on a remote controller 200. Also, the BIOS-setup menu in operation S420 and the remote-control password-setting mode in operation S430 may be entered by an operation of a keyboard of the computer 100 or by manipulating a remote-control password-setting mode button on the remote controller 200.

A user selects a user while in the remote-control password-setting mode in operation S440. The user inputs a remote-control password and a desired OS information using a remote controller 200 in operation S450. The selection of the user in operation S440 may be executed by the operation of a computer keyboard or an input unit 210 of the remote controller 200.

The Micom 130 of the computer 100 extracts the received remote-control password and the desired OS information from the control signal and transmits the received items to the BIOS 120 in operation S460. The BIOS 120 stores the remote-control password and the desired OS information in a specific area of the memory 140 (e.g., an EEPROM) in operation S470. The Micom 130 activates a power ON mode bit by using the remote controller 200 to indicate that the computer 100 can be operated by the remote controller 200 in operation S480.

Figure 5:
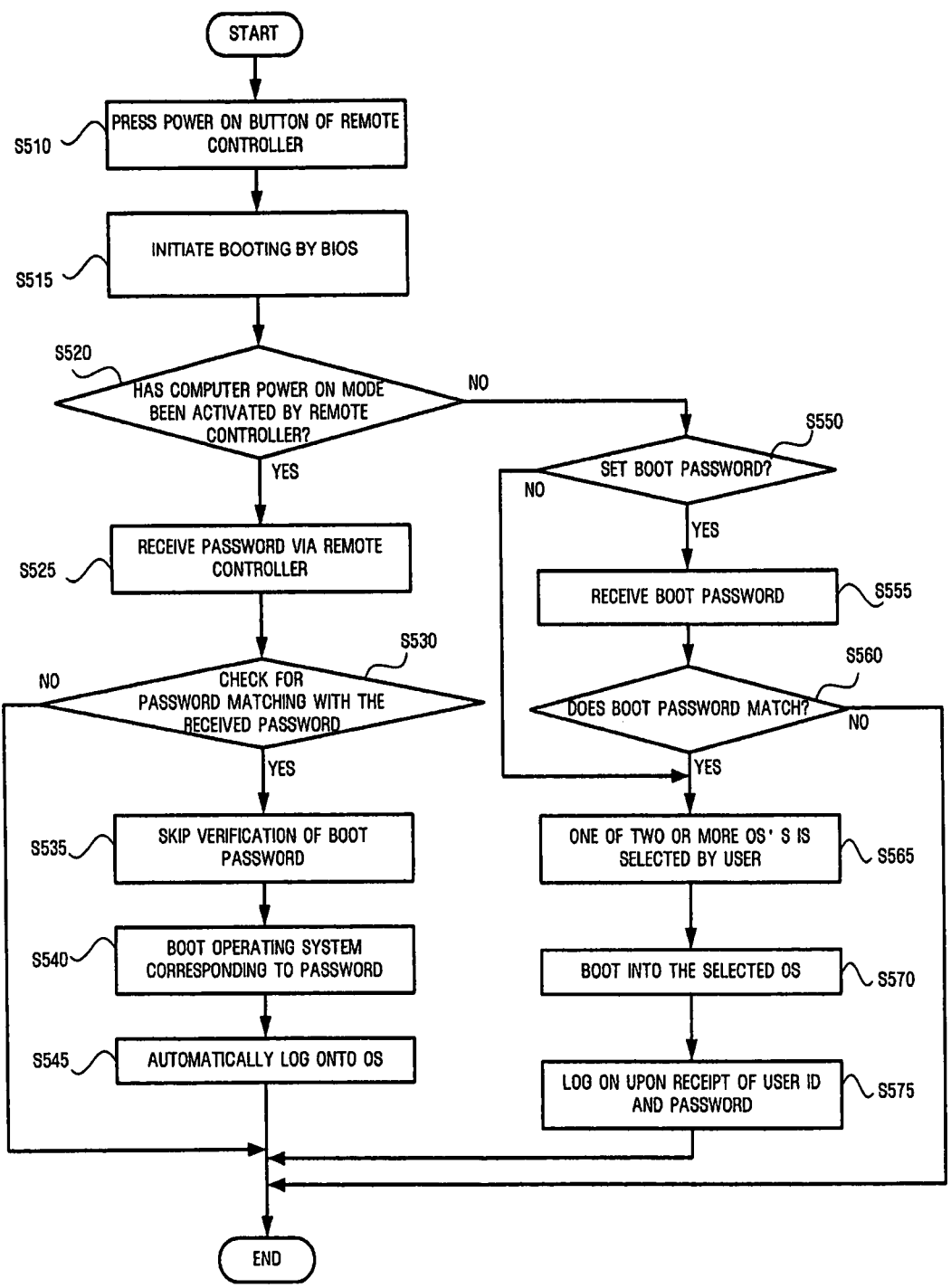
FIG. 5 is a flowchart illustrating a process of operating a computer using a remote controller in a remote control method according to an aspect of the present invention.

FIG. 5 is a flowchart illustrating a process of operating a computer by a remote controller in a remote control method according to an aspect of the present invention.

When a user presses a power-on button of a remote controller 200 in operation S510, the computer 100 receives a remote control signal corresponding to an on command, and initiates booting by BIOS 120 in operation S515. The Micom 130 checks whether a computer power-on mode has been activated by the remote controller 200 in operation S520. If the mode has been activated ("yes" in operation S520), the Micom 130 receives a remote-control password via the remote controller 200 in operation S525.

If the received remote-control password matches at least one of the remote control passwords stored in the memory device 140 ("yes" in operation S530), the BIOS 120 bypasses a process of verifying a boot password in operation S535. Then the BIOS 120 boots the OS registered to correspond with the remote-control password in operation S540. If needed, the BIOS 120 executes a specific application, and may skip a process of receiving the user ID and password of the OS, and automatically log on to the OS in operation S545.

Conversely, if the mode has not been activated by the remote controller 200 ("no" in operation S520), the BIOS 120 executes a general boot-password verifying-procedure. That is, the BIOS 120 checks if the boot password has been set in operation S550 and if the boot password has been set ("yes" in operation S550), the BIOS 120 receives the boot password input from the user via the keyboard in operation S555, and determines whether the input boot password matches the registered boot password in operation S560. If the boot passwords match ("yes" in operation S560), the user selection of the desired OS from the two or more OSs is received in operation S565. The BIOS 120 boots the computer using the selected OS S570. The OS receives the user's ID and password, and logs on if the received ID and password are valid S575.

Conversely, if the boot password has not been set ("no" in operation S550), then the receipt of the boot password (operation S555) and the match of the input boot password (operation S560) are skipped and operation S565 is performed. Also, if the received remote-control password does not match at least one of the remote control passwords stored in a memory device ("no" in operation S530), or if the boot passwords does not match ("no" in operation S560), the process ends. While not required in all aspects, one or more remote-control passwords may be the same as one or more boot passwords. Further, instead of ending the process in operations S530, S560, the user may be given additional chances to enter the correct password or the user may be allowed only limited access to the computer.

Figure 6:
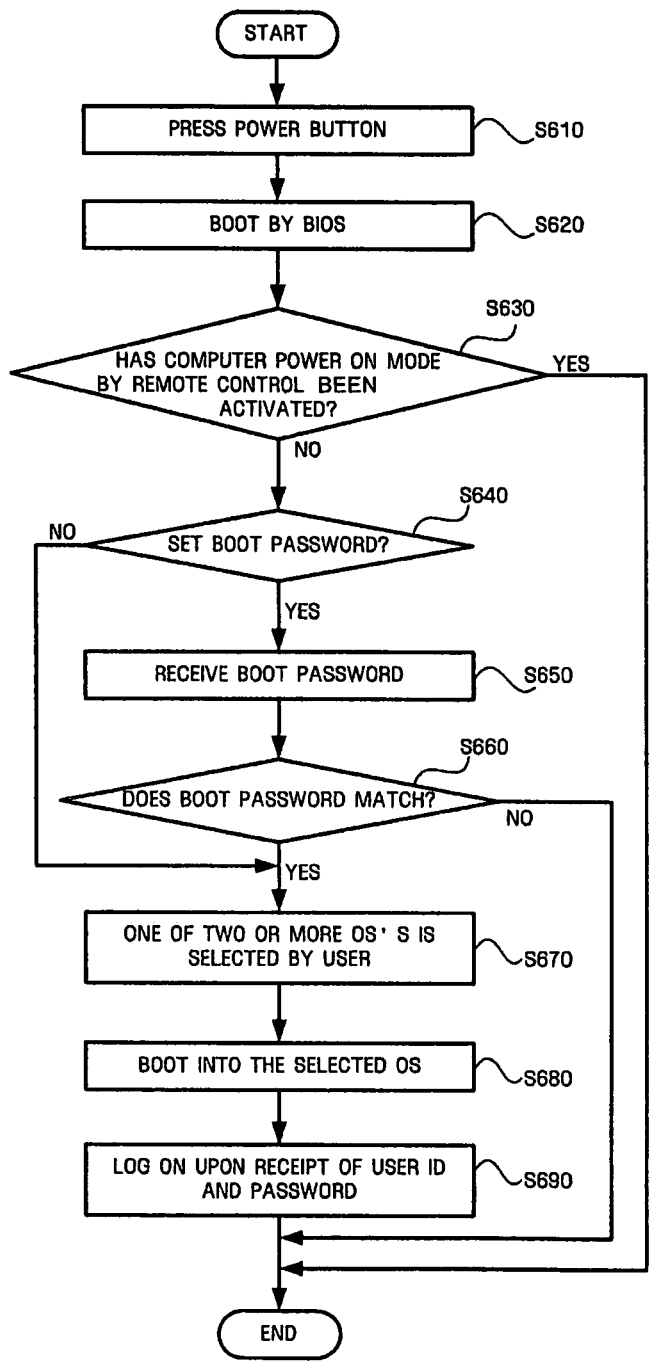
FIG. 6 is a flow chart illustrating a process of operating a computer in a remote control method using a power-on button of a computer according to an aspect of the present invention.

FIG. 6 is a flow chart illustrating a process of operating a computer 100 in a remote control method using a power-on button 101 of the computer 100 according to an aspect of the present invention.

When a user presses a power-on button 101 of the computer 100 in operation S610, a booting process is initiated by the BIOS 120 in operation S620. The Micom 130 checks whether a computer power ON mode has been activated by a remote controller 200 in operation S630. If the mode has not been activated ("no" in operation S630), a general boot-password verifying-procedure is executed. That is, the BIOS 120 checks if a boot password has been set in operation S640. If the boot password has been set ("yes" in operation S640), the BIOS 120 receives the boot password input from a user via a keyboard in operation S650, and checks if the input boot password matches with the registered boot password. If the boot password matches the registered boot password in operation S660, the user selection of an OS from the two or more OSs occurs in operation S670, and the selected OS is booted in operation S680. The OS receives the user's ID and password, and logs on if the received ID and password are valid S690.

Conversely, if the computer power-on mode has been activated by a remote controller 200 ("yes" in operation S630), the computer 100 is turned off so that it may only be operated using the remote controller 200. Also, if the boot password has not been set ("no" in operation S640), the receipt of the boot password input from a user via a keyboard in operation S650, and checking the input boot password matches with the registered boot password in operation S660 are skipped. Also, if the boot passwords do not match in operation S660, the process ends.

In another aspect of the present invention, even if a remote-control password is registered, the BIOS 120 may execute multi-user computer booting processes (operations S640 and/or S690) when a user presses the power button of the computer 100 without checking whether the computer power-on mode has been activated by the remote controller 200. While described in the context of passwords, it is understood that the remote controller can utilize other authentication mechanisms, such as biometrics, to determine the user password sent to the computer.

According to aspects of the present invention, security can be fortified in a multi-user computer system by having each user set his/her own remote-control password and operate the computer by a remote controller.

According to aspects of the present invention, a computer is immediately and conveniently turned on and a user-chosen OS is booted in a single operation of a remote controller by linking an OS information with a remote-control password.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A multi-user computer system, comprising:
   a remote controller, including:
      an input unit having at least one key and configured to receive a remote-control password to remotely operate a computer, information on an operating system (OS) to be booted when the remote-control password is input, a key input setting the computer in a mode in which the remote-control password and the OS information are set, and a key input operating the computer;
      a microprocessor configured to convert the remote-control password in the input unit, the OS information, the mode-setting key input, and the computer-operating key input, into a control signal; and
      a wireless transmitter configured to transmit the control signal; and
   a computer, including:
      a plurality of operating systems;
      a wireless receiver configured to receive the control signal transmitted by the remote controller to remotely operate the computer;
      a computer microprocessor configured to extract the remote-control password, the information on the OS, the input key for the setting mode, and the input key to operate the computer, and configured to control the computer power;
      a memory configured to store the remote-control password and the information on the OS; and
      a BIOS configured to automatically load an OS corresponding to the remote-control password stored in the memory when the received remote-control password stored in the wireless receiver and the remote-control password in the memory are the same and configured to store the remote-control password and the information on the OS in the memory when the computer is set in the mode in which the remote-control password and the OS information are set,
   wherein, when the mode-setting input key is present in the control signal, the computer microprocessors sets the computer in the mode in which the remote-control password and the OS information are set.

2. The system of claim 1, further comprising a hard disk having recorded therein information on the positions of the OSs in the hard disk.

3. The system of claim 1, wherein the BIOS executes an application that automatically logs on to the OS.

4. The system of claim 1, wherein the computer microprocessor compares the received remote-control password and the stored remote-control password if information indicating that the computer may be operated by the remote controller is set.

5. The system of claim 1, wherein the computer microprocessor turns the computer off when information showing that the computer is to be operated by the remote controller is set, and the computer is turned on by a power button on the computer.

6. A remote control method for a multi-user computer system, comprising: receiving at a remote controller the remote-control password, and information on an operating system (OS) that will be booted by a computer having a plurality of operating systems when the remote-control password is input, a key input setting the computer in a mode in which the remote-control password and the OS information are set, and a key input operating the computer;
    switching, at the computer, to a remote control password setting mode in response to receiving a control signal from the remote controller indicating that the computer is to switch to the remote control password setting mode;
    storing the remote-control password and the information on the OS when the computer is set in the mode in which the remote-control password and the OS information are set;
    setting information indicating that the computer is to be operated by the remote controller; and
    automatically loading an OS corresponding to the remote-control password stored in the memory when the received remote-control password stored in the wireless receiver and the remote-control password in the memory are the same.

7. The method of claim 6, wherein switching to the remote-control password-setting mode includes:
    turning on the computer;
    setting the computer in a BIOS-setup menu; and
    switching to a state where the computer can receive the remote-control password and information on the OS.

8. The method of claim 6, further comprising receiving information on a specific user when the computer is usable by multiple users, wherein the remote-control password and information on the OS are for the specific user.

9. A method of remotely operating a computer, comprising: checking whether a power-on mode has been activated by a prior remote controller operation; receiving a remote-control password via a remote controller; automatically loading an OS corresponding to the remote-control password stored in a memory of the computer when the received remote-control password and the remote-control password in the memory are the same; and
    logging on automatically to the operating system,
    wherein the prior remote controller operation comprises:
    turning on a computer;
    receiving a mode-setting key input from the remote controller setting the computer in a remote-control password-setting mode;
    entering the remote-control password-setting mode according to the mode-setting key input received from the remote controller;
    receiving a remote-control password and a desired operating system information from the remote controller;
    storing the remote-control password and the desired operating system information in a specific area of the memory; and
    activating the power on mode by using the remote controller to indicate that the computer can be operated by the remote controller.

10. The method of claim 9, further comprising bypassing a process of verifying a general boot password if the received remote-control password matches at least one remote control passwords stored in a memory device.

11. The method of claim 9, wherein if the power-on mode has not been activated by the prior remote operation, executing a general boot-password verifying-procedure.

12. The method of claim 11, wherein the general boot-password verifying-procedure comprises:
    checking whether the boot password has been set;
    receiving an input boot password;
    matching the input boot password with the registered boot password;
    selecting a desired operating system according to the match result; and
    booting the computer using the selected operating system.

13. The method of claim 9, wherein if the power-on mode has been activated by the previous remote controller operation, the computer is turned off so that the computer may only be operated using the remote controller.

14. The method of claim 9, further comprising receiving a remote control signal corresponding to an on command of the computer.

\* \* \* \* \*